(12) United States Patent
Na

(10) Patent No.: US 11,428,973 B2
(45) Date of Patent: Aug. 30, 2022

(54) TOUCH SCREEN, DISPLAY DEVICE HAVING THE SAME, AND DRIVING METHOD THEREOF

(71) Applicant: SAMSUNG DISPLAY CO., LTD., Yongin-si (KR)

(72) Inventor: Hoe Seok Na, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/739,023

(22) Filed: Jan. 9, 2020

(65) Prior Publication Data

US 2020/0142519 A1    May 7, 2020

Related U.S. Application Data

(62) Division of application No. 15/682,811, filed on Aug. 22, 2017, now Pat. No. 10,534,486.

(30) Foreign Application Priority Data

Sep. 27, 2016 (KR) ........................ 10-2016-0124099

(51) Int. Cl.
*G02F 1/1333* (2006.01)
*G06F 3/044* (2006.01)
*G02F 1/1343* (2006.01)

(52) U.S. Cl.
CPC ........ *G02F 1/13338* (2013.01); *G02F 1/1343* (2013.01); *G06F 3/0445* (2019.05); *G06F 3/0446* (2019.05); *G06F 3/0447* (2019.05); *G06F 2203/04108* (2013.01)

(58) Field of Classification Search
CPC .. G02F 1/13338; G02F 1/1343; G06F 3/0445; G06F 3/0446; G06F 3/0447
See application file for complete search history.

(56) References Cited

U.S. PATENT DOCUMENTS

| 8,477,120 | B2 | 7/2013 | Jang et al. |
| 9,665,203 | B2 | 5/2017 | Xu et al. |
| 10,402,000 | B2 * | 9/2019 | Jamshidi-Roudbari ...................... G06F 3/0447 |
| 2009/0211818 | A1 | 8/2009 | Kondo et al. |
| 2010/0156805 | A1 * | 6/2010 | Brand ............... G06F 3/041661 345/173 |

(Continued)

FOREIGN PATENT DOCUMENTS

| CN | 102591536 A | 7/2012 |
| CN | 103257769 A | 8/2013 |

(Continued)

*Primary Examiner* — Ariel A Balaoing
(74) *Attorney, Agent, or Firm* — Lewis Roca Rothgerber Christie LLP

(57) ABSTRACT

A touch screen includes a first electrode layer, an insulating layer on a first electrode layer, and a second electrode layer on the insulating layer. The first electrode layer or second electrode layer includes first sensing electrode columns and second sensing electrode columns. The first sensing columns include first sensing electrodes having sub-electrodes. The second sensing electrode columns are alternately arranged with the first sensing electrode columns and include second sensing electrode. The sub-electrodes of one of adjacent first sensing electrodes are electrically connected to sub-electrodes of another one of the adjacent first sensing electrodes, respectively.

5 Claims, 7 Drawing Sheets

(56) References Cited

U.S. PATENT DOCUMENTS

| | | | |
|---|---|---|---|
| 2014/0022186 A1 | 1/2014 | Hong et al. | |
| 2014/0106503 A1 | 4/2014 | Hirakata et al. | |
| 2014/0211104 A1 | 7/2014 | Yang | |
| 2014/0218334 A1* | 8/2014 | Shibata | G06F 3/045 |
| | | | 345/174 |
| 2014/0247239 A1* | 9/2014 | Jamshidi-Roudbari | |
| | | | G06F 3/0447 |
| | | | 345/174 |
| 2014/0247244 A1* | 9/2014 | Wang | G06F 3/0443 |
| | | | 345/174 |
| 2015/0060255 A1 | 3/2015 | Chen | |
| 2015/0185562 A1 | 7/2015 | Baek et al. | |
| 2015/0261348 A1 | 9/2015 | Jang et al. | |
| 2015/0268783 A1* | 9/2015 | Yoon | G06F 3/0445 |
| | | | 345/173 |
| 2015/0287381 A1 | 10/2015 | Kim et al. | |
| 2015/0309634 A1 | 10/2015 | Lee et al. | |
| 2016/0088133 A1* | 3/2016 | Kim | G06F 3/0447 |
| | | | 345/174 |
| 2016/0188082 A1 | 6/2016 | Ham et al. | |
| 2016/0196003 A1 | 7/2016 | Yoon et al. | |
| 2016/0252996 A1 | 9/2016 | Jiang | |
| 2016/0370899 A1* | 12/2016 | Chang | G06F 3/044 |
| 2017/0010740 A1* | 1/2017 | Chuang | G06F 3/0414 |
| 2017/0115813 A1* | 4/2017 | Chen | G06F 3/0445 |
| 2017/0220184 A1* | 8/2017 | Liu | G06F 3/0414 |
| 2017/0235414 A1* | 8/2017 | Ding | G02F 1/133512 |
| | | | 345/174 |
| 2017/0255298 A1* | 9/2017 | Choi | G06F 3/0445 |
| 2017/0277329 A1* | 9/2017 | Ding | G06F 3/0447 |
| 2018/0046279 A1* | 2/2018 | Weng | G06F 3/044 |
| 2019/0339817 A1* | 11/2019 | Kim | G06F 3/0412 |

FOREIGN PATENT DOCUMENTS

| | | |
|---|---|---|
| KR | 10-2015-0108003 A | 9/2015 |
| KR | 10-1633175 B1 | 6/2016 |
| KR | 10-2016-0080069 A | 7/2016 |
| KR | 10-1679622 B1 | 11/2016 |

* cited by examiner

TOUCH SCREEN, DISPLAY DEVICE HAVING THE SAME, AND DRIVING METHOD THEREOF

CROSS-REFERENCE TO RELATED APPLICATION

This application is a continuation of U.S. patent application Ser. No. 15/682,811, filed Aug. 22, 2017, which claims priority to and the benefit of Korean Patent Application No. 10-2016-0124099, filed Sep. 27, 2016, the entire content of both of which is incorporated herein by reference.

BACKGROUND

1. Field

One or more embodiments described herein a touch screen, a display device having a touch screen, and a method for driving a display device.

2. Description of the Related Art

Many displays have a touch screen. Some touch screens are attached to a surface of a display panel. Other touch screens are integrally formed with the display panel. A user may input information by pressing or touching the touch screen while viewing a displayed image. One type of display has a touch screen that detects not only the position of a user touch but also the amount of pressure of the user touch.

SUMMARY

In accordance with one or more embodiment, a touch screen includes a first electrode layer; an insulating layer on the first electrode layer; and a second electrode layer on the insulating layer, wherein one of the first electrode layer or the second electrode layer includes: a plurality of first sensing electrode columns including a plurality of first sensing electrodes having a plurality of sub-electrodes, the first sensing electrode columns extending in one direction; and a plurality of second sensing electrode columns including a plurality of second sensing electrode, the second sensing electrode columns alternately arranged with the first sensing electrode columns, wherein sub-electrodes of one of adjacent first sensing electrodes are electrically connected to sub-electrodes of another one of the adjacent first sensing electrodes, respectively.

In each of the first sensing electrode columns, the first sensing electrodes may include n (n is a natural number of 2 or more) sub-electrodes sequentially arranged in the direction in which the first sensing electrode columns extend, and a jth (j is a natural number of n or less) sub-electrode of one of adjacent first sensing electrodes and an (n−j+1)th sub-electrode of the other of the adjacent first sensing electrodes are electrically connected to each other through a sensing line.

A sensing line connected to the jth sub-electrode of one of the first sensing electrode columns may be electrically connected to a sensing line connected to the jth sub-electrode of another one of the first sensing electrode columns. The second sensing electrode columns may include q (q is a natural number of 2 or more) second sensing electrodes, and a sensing line connected to an ith (i is a natural number of q or less) second sensing electrode of one of adjacent second sensing electrode columns may be electrically connected to a sensing line connected to an ith second sensing electrode of the other one of the adjacent second sensing electrode columns.

The sub-electrodes of the first sensing electrodes and the second sensing electrodes may include a plurality of first conductive fine lines extending in one direction and parallel to one another; and a plurality of second conductive fine lines extending in a direction intersecting the first conductive fine lines and being parallel to one another. The other of the first electrode layer or the second electrode layer may have a plate shape.

The other of the first electrode layer or the second electrode layer may include a transparent conductive material. The other of the first electrode layer or the second electrode layer may be applied with a constant voltage. The sub-electrodes may be applied with a touch driving signal at all touch driving times, and the second sensing electrodes may be applied with a pressure driving signal at idle times between the touch driving times. The insulating layer may include a polymer material having elasticity In accordance with one or more other embodiments, a display device includes a display panel; and a touch screen on at least one surface of the display panel, wherein the touch screen includes a first electrode layer, an insulating layer on the first electrode layer, and a second electrode layer on the insulating layer, and wherein one of the first electrode layer or the second electrode layer includes: a plurality of first sensing electrode columns including a plurality of first sensing electrodes having a plurality of sub-electrodes, the first sensing electrode columns extending in one direction; and a plurality of second sensing electrode columns including a plurality of second sensing electrode, the second sensing electrode columns alternately arranged with the first sensing electrode columns, wherein sub-electrodes of one of adjacent first sensing electrodes are electrically connected to sub-electrodes of another of the adjacent first sensing electrodes, respectively.

In each of the first sensing electrode columns, the first sensing electrodes may include n (n is a natural number of 2 or more) sub-electrodes sequentially arranged in the direction in which the first sensing electrode columns extend, and a jth (j is a natural number of n or less) sub-electrode of one of adjacent first sensing electrodes and an (n−j+1)th sub-electrode of the other of the adjacent first sensing electrodes may be electrically connected to each other through a sensing line.

A sensing line connected to the jth sub-electrode of one of the first sensing electrode columns may be electrically connected to a sensing line connected to the jth sub-electrode of another of the first sensing electrode columns. The second sensing electrode columns may include q (q is a natural number of 2 or more) second sensing electrodes, and a sensing line connected to an ith (i is a natural number of q or less) second sensing electrode of one of adjacent second sensing electrode columns may be electrically connected to a sensing line connected to an ith second sensing electrode of the other of the adjacent second sensing electrode columns. The other of the first electrode layer and the second electrode layer may have a plate shape.

The other of the first electrode layer or the second electrode layer may be applied with a constant voltage, the sub-electrodes may be applied with a touch driving signal at all touch driving times, and the second sensing electrodes may be applied with a pressure driving signal at idle times between the touch driving times. The insulating layer may include a polymer material having elasticity.

In accordance with one or more other embodiments, a method for driving a touch screen includes applying a touch driving signal to sub-electrodes of first sensing electrodes for each of a plurality of touch driving times that are periodically repeated; and applying a pressure driving signal to second sensing electrodes at at least some idle times among idle times between the touch driving times. Applying the pressure driving signal to the second sensing electrodes may include periodically applying a first pressure driving signal in units of idle times, and when an external pressure is detected by the pressure driving signal, applying a second pressure driving signal for each of all of the idle times until before a subsequent first pressure driving signal is applied.

Applying the pressure driving signal to the second sensing electrodes may include applying a first pressure driving signal at arbitrary idle times; and when an external pressure is detected by the pressure driving signal, applying a second pressure driving signal for each of all of the idle times until before a subsequent first pressure driving signal is applied.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
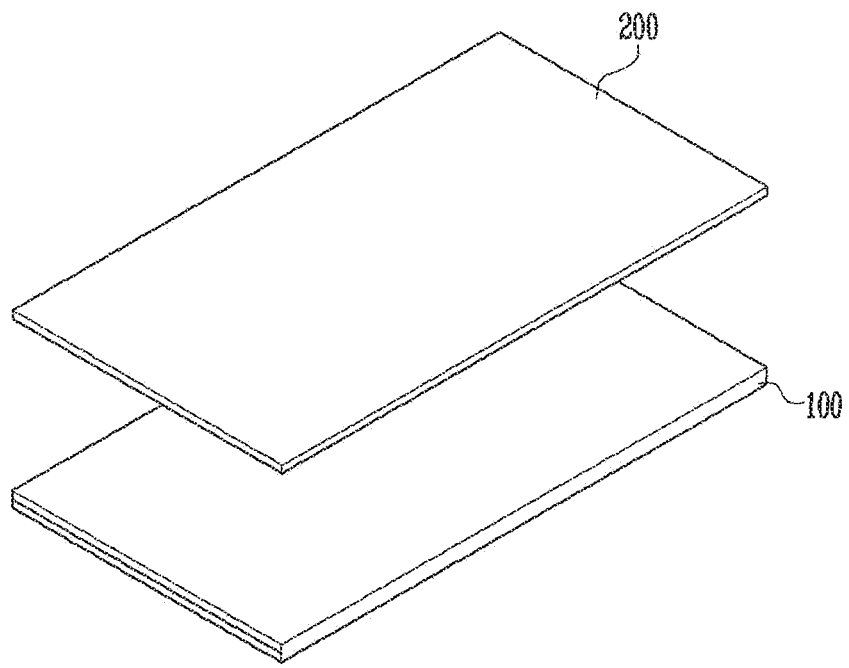
FIG. 1 illustrates an embodiment of a display device including a touch screen.

Example embodiments are described with reference to the drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
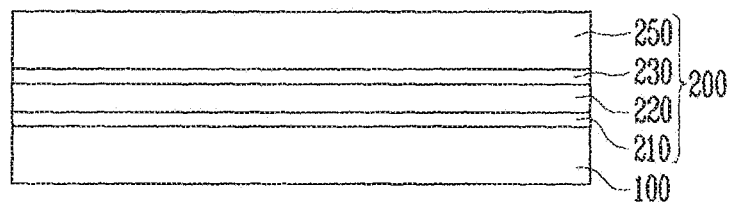
FIG. 2 illustrates a sectional view of the display device.
Figure 3:
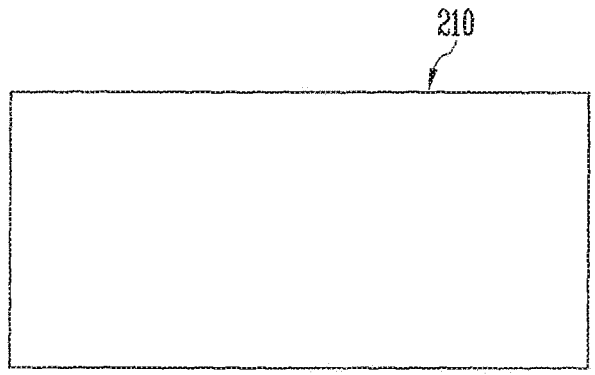
FIG. 3 illustrates an embodiment of a first electrode layer.
Figure 4:
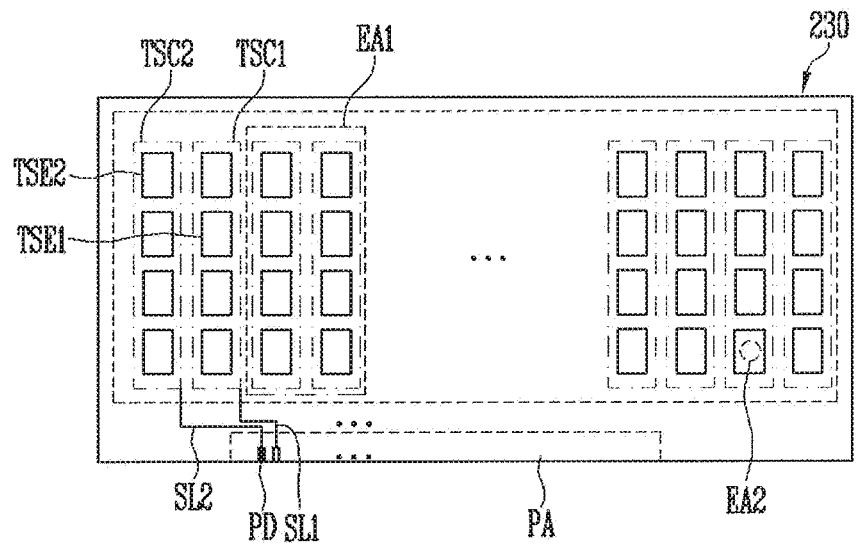
FIG. 4 illustrates an embodiment of a second electrode layer.

FIG. 1 illustrates an embodiment of a display device which includes a touch screen. FIG. 2 is a sectional view of an embodiment of the display device in FIG. 1. FIG. 3 illustrates an embodiment of a first electrode layer in FIG. 2. FIG. 4 illustrates an embodiment of a second electrode layer in FIG. 2.

Referring to FIGS. 1 to 4, the display device may include a display panel 100 and a touch screen 200. The display panel 100 may be, for example, a self-luminescent display panel such as an organic light emitting display (OLED) panel or a non-emissive display panel such as a liquid crystal display (LCD) panel, an electro-phoretic display (EPD) panel, or an electro-wetting display (EWD) panel. When the display panel 100 is a non-emissive display panel, the display device may include a backlight unit. The example of where the display panel 100 is an OLED panel is discussed.

The display panel 100 may include a plurality of pixels. In one embodiment, the pixels may emit red, green, blue, and white light. In another embodiment, the pixels may emit light of a different combination of colors, including but not limited to magenta, cyan, and yellow. Each pixel may include a display element, e.g., an organic light emitting element.

The display panel 100 may include an insulating substrate and at least one thin film transistor on the insulating substrate per pixel. The organic light emitting element of the pixel is connected to the thin film transistor. The display panel 100 may also include a driving unit, at one side of the insulating substrate, to drive the organic light emitting elements of the pixels. The driving unit may be, for example, a chip-on-glass (COG)-type driving element.

The organic light emitting element in each pixel may include a first electrode connected to the thin film transistor, an organic layer on the first electrode, and a second electrode on the organic layer. The first and second electrodes may be anode and cathode electrodes.

At least one of the first or second electrodes may be transparent electrode. For example, the first electrode may be a conductive layer which includes a transparent conductive oxide, e.g., indium tin oxide (ITO), indium zinc oxide (IZO), aluminum zinc oxide (AZO), gallium doped zinc oxide (GZO), zinc tin oxide (ZTO), gallium tin oxide (GTO), or fluorine doped tin oxide (FTO). The second electrode may include at least one of Mo, MoW, Cr, Al, AlNd, or Al or an alloy thereof to perform light reflection and having a low work function compared to the first electrode.

The organic layer includes at least an emitting layer (EML). In one embodiment, the organic layer has a multi-layered thin film structure. For example, the organic layer may include a hole injection layer (HIL) for injecting holes and a hole transport layer (HTL) having an excellent hole transporting property. The HTL may increase the opportunity for holes and electrons to be re-combined by suppressing movement of electrons that do not combine in the EML. The EML may emit light based on the re-combination of the injected electrons and holes. The organic layer may also include a hole blocking layer (HBL) for blocking movement of holes not combined in the EML, an electron transport layer (ETL) for smoothly transporting electrons to the EML, and an electron transport layer (EIL) for injecting electrons.

The color of light generated in the EML may be, for example, red, green, blue, or white, or may be magenta, cyan, or yellow.

An encapsulation member may be on the organic light emitting element. The encapsulation member may be, for example, a thin film encapsulation layer including a plurality of insulating layers that cover the organic light emitting element. The thin film encapsulation layer may include a plurality of inorganic layers and a plurality of organic layers. For example, the thin film encapsulation layer may have a structure in which the inorganic layers and the organic layers are alternately stacked. In some cases, the encapsulation member may be an encapsulation substrate on the organic light emitting element. The encapsulation substrate may be joined with the insulating substrate, for example, by a sealant.

The touch screen 200 may be on one or both surfaces of the display panel 100. For example, the touch screen 200 may be on a surface in the direction in which an image of the display panel 100 is emitted to receive a touch input of a user. In one embodiment, the touch screen 200 may be integrally formed with the display panel 100.

The touch screen 200 may include a first electrode layer 210 on one surface of the display panel 100, an insulating layer 220 on the first electrode layer 210, and a second electrode layer 230 on the insulating layer 220. One of the first or second electrode layers 210 and 230 (e.g., the second electrode layer 230) may include a plurality of first sensing electrode columns TSC1 having a plurality of first sensing electrodes TSE1, a plurality of second sensing electrode columns TSC2 alternately disposed with the first sensing electrode column TSC1 and including a plurality of second sensing electrodes TSE2, a plurality of first sensing lines SL1 connected to the first sensing electrodes TSE1, a plurality of second sensing lines SL2 connected to the second sensing electrodes TSE2, and a pad part PA electrically connecting the first sensing electrodes TSE1 and the second sensing electrodes TSE2 to an external driving circuit through the first sensing lines SL1 and the second sensing lines SL2.

Therefore, one of the first sensing electrodes TSE1 or the second sensing electrodes TSE2 (e.g., the first sensing electrodes TSE1) may be touch driving electrodes that receive touch driving signals. The other of the first sensing electrodes TSE1 or the second sensing electrodes TSE2 (e.g., the second sensing electrodes TSE2) may be touch receiving electrodes that output touch sensing signals. Thus, the second electrode layer 230 may detect the touch of a user based on the variation in capacitance of a first capacitor between the first sensing electrodes TSE1 and second sensing electrodes TSE2.

Both of the first sensing electrode columns TSC1 and the second sensing electrode columns TSC2 may extend in one direction. The first sensing electrodes TSE1 may be arranged in the direction in which the first sensing electrode columns TSC1 extend. The second sensing electrodes TSE2 may be arranged in the direction in which the second sensing electrode columns TSC2 extend. The first sensing electrodes TSE1 and the second sensing electrodes TSE2 may sense a change in capacitance from a touch input of a specific object, a user body part or stylus pen. The first sensing electrodes TSE1 and the second sensing electrodes TSE2 may include a conductive material for sensing the change in capacitance.

The first sensing lines SL1 and the second sensing lines SL2 may transmit the change in capacitance (sensed by the first sensing electrodes TSE1 and the second sensing electrodes TSE2) to an external circuit through the pad part PA. Also, like the first sensing electrodes TSE1 and the second sensing electrodes TSE2, the first sensing lines SL1 and the second sensing lines SL2 may include a conductive material.

The pad part PA may include a plurality of pads PD electrically connected to the first sensing electrodes TSE1 and the second sensing electrodes TSE2 through the first sensing lines SL1 and the second sensing lines SL2.

The other of the first electrode layer 210 or the second electrode layer 230 (e.g., the first electrode layer 210) may be a plate-shaped electrode overlapping the second electrode layer 230. The first electrode layer 210 may include, for example, a transparent conductive material. The transparent conductive material may include at least one of conductive nano-wire, transparent conductive oxide, carbon nano tube, and graphene. The conductive nano-wire may include at least one of silver nano-wire (AgNW), gold nano-wire, or copper nano-wire. The transparent conductive oxide may include at least one of indium tin oxide (ITO), indium zinc oxide (IZO), aluminum zinc oxide (AZO), gallium doped zinc oxide (GZO), zinc tin oxide (ZTO), gallium tin oxide (GTO), or fluorine doped tin oxide (FTO). The first electrode layer 210 may be formed as a single layer or multiple layers. A constant voltage (e.g., a ground voltage) may be applied to the first electrode layer 210.

The insulating layer 220 has elasticity and may include, for example, a light-transmitting material. Because the insulating layer 220 has elasticity, the insulating layer 220 may be deformed by external pressure, e.g., the pressure applied by a user touch. When the pressure is removed, insulating layer 220 may return to its original state.

The insulating layer 220 may include, for example, a polymer material, e.g., at least one of thermoplastic elastomer, polystyrene, polyolefin, polyurethane thermoplastic elastomers, polyam ides, synthetic rubbers, polydimethylsiloxane, polybutadiene, polyisobutylene, poly(styrene-butadienestyrene), polyurethanes, polychloroprene, polyethylene, or silicone resin. The insulating material 220 may include a different material in another embodiment.

The first electrode layer 210 may form a second capacitor together with a least a portion of the second electrode layer 230, e.g., one or more of the second sensing electrodes TSE2. The external pressure changes the thickness of the insulating layer 220. As a result, the capacitance of the second capacitor may be changed. For example, when external pressure is applied, the thickness of the insulating layer 220 decreases. As a result, the distance between the first electrode layer 210 and the second electrode layer 230 may decrease. Therefore, the capacitance of the second capacitor may increase. Thus, touch screen 200 is able to detect external pressure based on a variation in capacitance of the second capacitor.

The touch screen 200 may further include a window 250 made of a transparent material and disposed on the second electrode layer 230. The window 250 may protect the exposed surface of the touch screen 200, e.g., the second electrode layer 230. The window 250 may be, for example, a high strength transparent plastic substrate or a high strength transparent glass substrate. In one embodiment, window 250 may be replaced by an encapsulation layer covering the second electrode layer 230.

In this embodiment, the second electrode layer 230 is on the top of the first electrode layer 210. In one embodiment, the first electrode layer 210 may be on the top of the second electrode layer 230.

Figure 5:
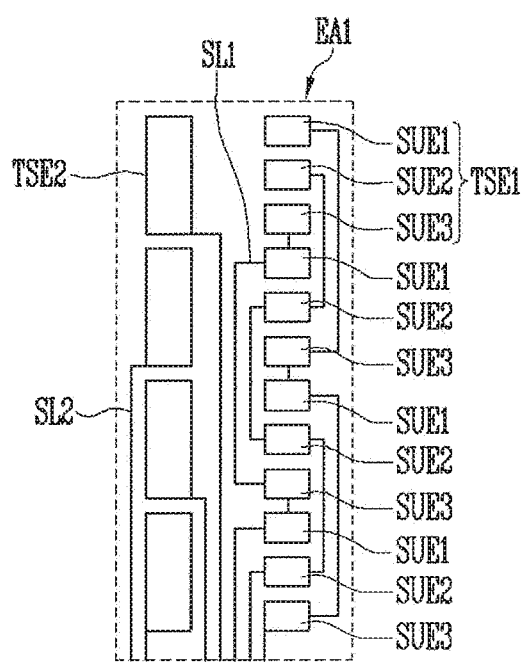
FIG. 5 illustrates an embodiment of area EA1 in FIG. 4.
Figure 6:
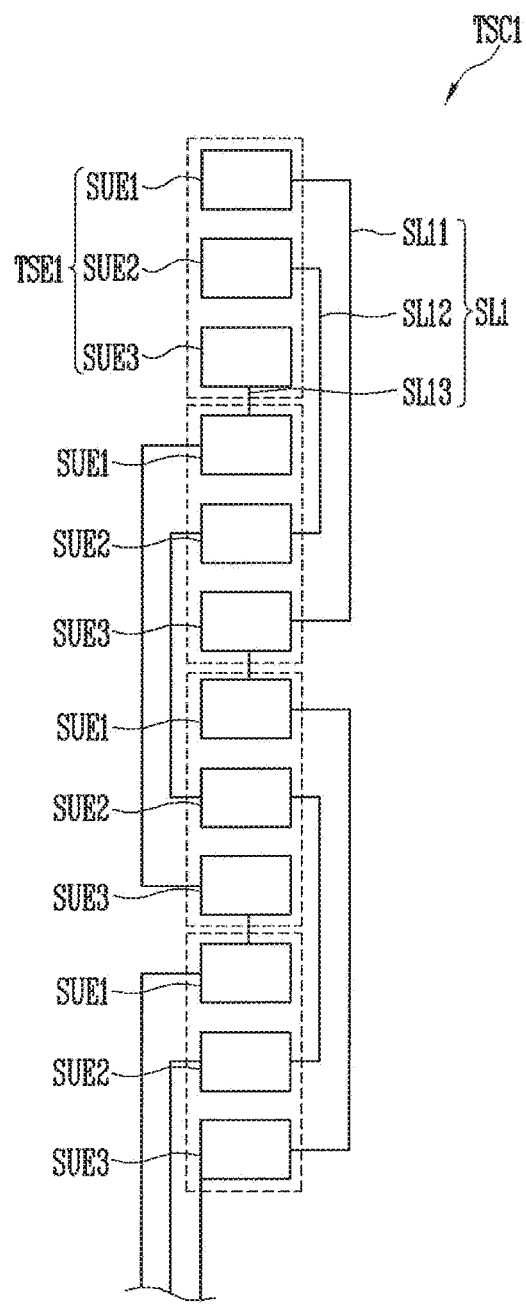
FIG. 6 illustrates an embodiment of first sensing electrodes and first sensing lines of a first sensing electrode column in FIG. 4.
Figure 7:
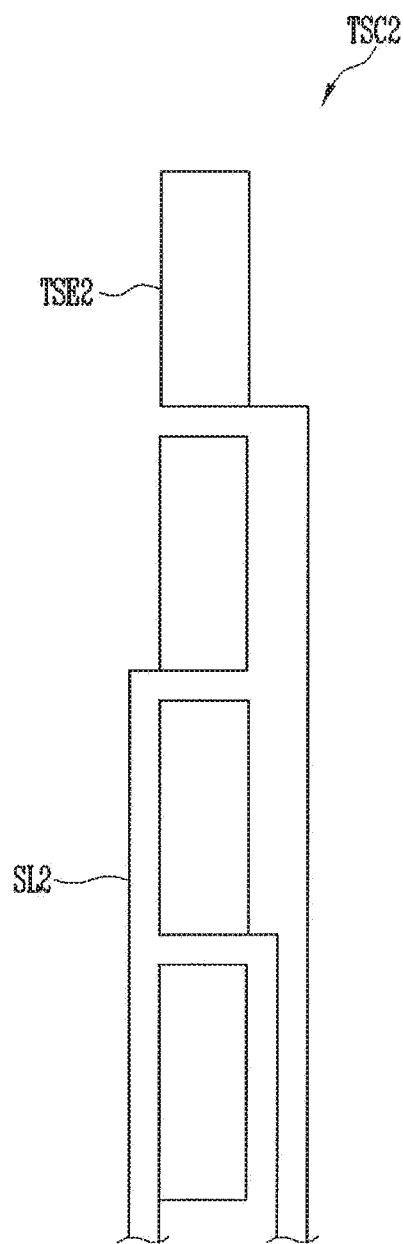
FIG. 7 illustrates an embodiment of second sensing electrodes and second sensing lines of a second sensing electrode column in FIG. 4.
Figure 8:
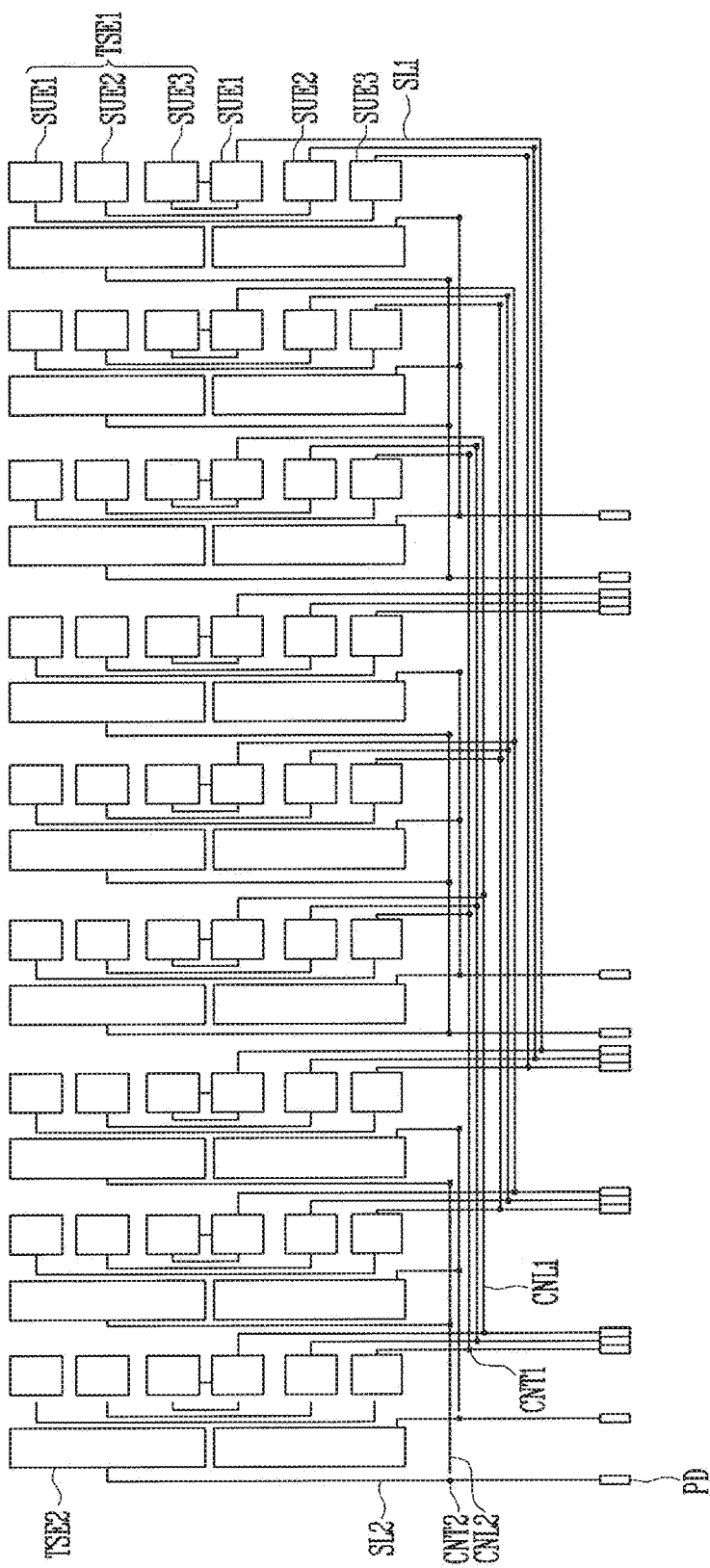
FIG. 8 illustrates an embodiment of a connection relationship of the first sensing electrodes, the second sensing electrodes, the first sensing lines, the second sensing lines, and connecting lines.
Figure 9:
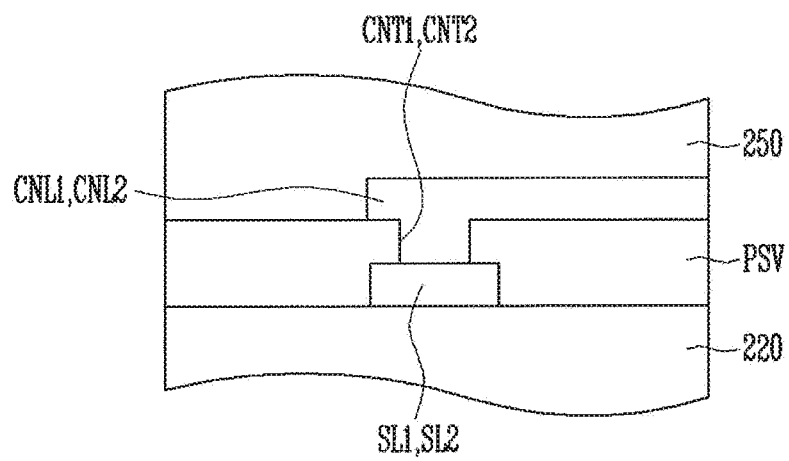
FIG. 9 illustrates an embodiment of a connection relationship of the sensing lines and the connecting lines in FIG. 8.
Figure 10:
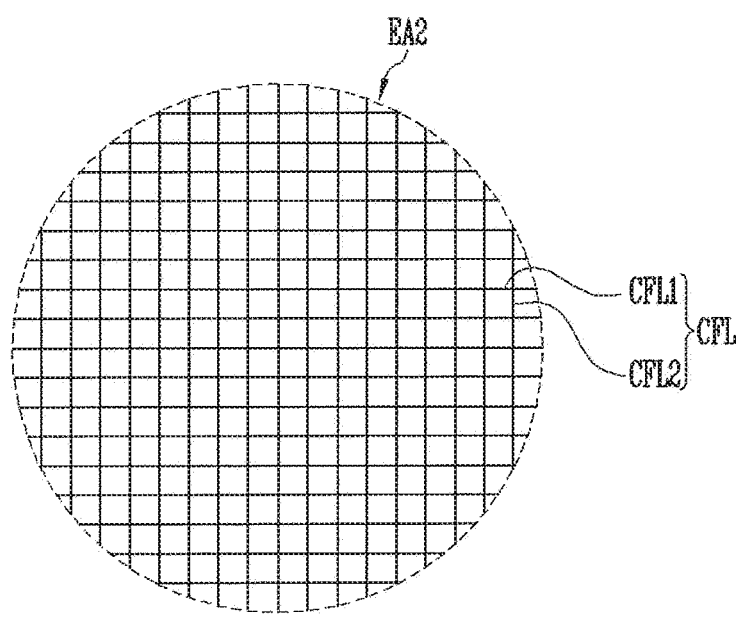
FIG. 10 illustrates an embodiment of area EA2 in FIGS. 4.

FIG. 5 illustrates an enlarged view of an embodiment of an area EA1 in FIG. 4. FIG. 6 illustrates an embodiment of the first sensing electrodes and the first sensing lines of the first sensing electrode column in FIG. 4. FIG. 7 illustrates an embodiment of the second sensing electrodes and the second sensing lines of the second sensing electrode column in FIG. 4. FIG. 8 illustrates an embodiment of a sectional view of a connection relationship of the first sensing electrodes, the second sensing electrodes, the first sensing lines, the second sensing lines, and connecting lines. FIG. 9 illustrates an embodiment of a sectional view of a connection relationship of the sensing lines and the connecting lines of FIG. 8. FIG. 10 illustrates an enlarged view of an embodiment of an area EA2 in FIG. 4.

Referring to FIGS. 1 to 10, the second electrode layer 230 may include a plurality of first sensing electrode columns TSC1 and a plurality of second sensing electrode columns TSC2. The first sensing electrode columns TSC1 extend in one direction and are parallel to one another. The second sensing electrode columns TSC2 extend parallel to the first sensing electrode columns TSC1 and are alternately disposed with the first sensing electrode columns TSC1.

The first sensing electrode columns TSC1 may include a plurality of first sensing electrodes TSE1. For example, one first sensing electrode column TSC1 may include m (m is a natural number of 2 or more) first sensing electrodes TSE1. The first sensing electrodes TSE1 may be arranged in the direction in which the first sensing electrode columns TSC1 extend.

The first sensing electrodes TSE1 may include n sub-electrodes SUE1, SUE2, and SUE3 spaced apart from each other, where n is a natural number of 2 or more. The first sensing electrodes TSE1 may include, for example, three sub-electrodes: a first sub-electrode SUE1, a second sub-electrode SUE2, and a third sub-electrode SUE3. The first to third sub-electrodes SUE1, SUE2, and SUE3 may be sequentially arranged in the extending direction of the first sensing electrode columns TSC1. In one embodiment, the first sub-electrode SUE1 may be most distant from the pad part PA, and the third sub-electrode SUE3 may be closest to the pad part PA.

The sub-electrodes SUE1, SUE2, and SUE3 may be connected to first sensing lines SL1. The first sensing lines SL1 may be in an area between the first sensing electrode columns TSC1 and the second sensing electrode columns TSC2. In addition, the sub-electrodes SUE1, SUE2, and SUE3 of one of first sensing electrodes TSE1 adjacent to each other may be electrically connected the sub-electrodes SUE1, SUE2, and SUE3 of the other of the first sensing electrodes TSE1 through the first sensing lines SL1, respectively.

In one embodiment, each of the first sensing electrodes TSE1 includes n sub-electrodes SUE1, SUE2, and SUE3. A jth (j is a natural number of n or less) sub-electrode of one first sensing electrode TSE1 may be electrically connected to an (n−j+1)th sub-electrode of an adjacent first sensing electrode TSE1 through a j-ary first sensing line SL1. Therefore, when the number of sub-electrodes SUE1, SUE2, and SUE3 included in the first sensing electrode TSE1 is n, the number of first sensing lines SL1 corresponding to one first sensing electrode column TSC1 may be n.

For example, when each of the first sensing electrodes TSE1 includes three sub-electrodes SUE1, SUE2, and SUE3, a first sub-electrode SUE1 of one first sensing electrode TSE1 and a third sub-electrode SUE3 of an adjacent first sensing electrode TSE1 may be electrically connected to each other through a primary first sensing line SL11. A second sub-electrode SUE2 of the one first sensing electrode TSE1 and a second sub-electrode SUE2 of the adjacent first sensing electrode TSE1 may be electrically connected to each other through a secondary first sensing line SL12. A third sub-electrode SUE1 of the one first sensing electrode TSE1 and a first sub-electrode SUE1 of the adjacent first sensing electrode TSE1 may be electrically connected to each other through a tertiary first sensing line SL13. Thus, three first sensing lines SL1 may correspond to each of the first sensing electrode columns TSC1 may be three.

When the number of first sensing electrodes TSE1 in one first sensing electrode column TSC1 is m (m is a natural number of 2 or more), the number of sub-electrodes SUE1, SUE2, and SUE3 in one first sensing electrode TSE1 is n. The sub-electrodes SUE1, SUE2, and SUE3 may be in correspondence with respective ones of the first sensing lines SL1. When the number of first sensing electrode columns TSC1 is p, the second electrode layer 230 may require p×m×n first sensing lines SL1. Therefore, in an area between the first sensing electrode columns TSC1 and the second sensing electrode columns TSC2, the number of first sensing lines SL1 may increase in a direction towards the pad part PA.

As the number of the first sensing lines SL1 increases in the area between the first sensing electrode columns TSC1 and the second sensing electrode columns TSC2, electromagnetic interference caused by signals applied to the first sensing lines SL1 (e.g., noise) may increase. When the noise increases, the mutual capacitance between the first sensing electrode TSE1 and the TSE2 may decrease. Therefore, the touch sensing sensitivity of the area may decrease, with decreasing distance from the pad part PA, in the second electrode layer 230. In addition, in the second electrode layer 230, the touch sensing sensitivity at a location distant from the pad part PA and the touch sensing sensitivity at a location close to the pad part PA may be different from each other.

In one embodiment, in the second electrode layer 230, sub-electrodes SUE1, SUE2, and SUE3 of first sensing electrodes TSE1 adjacent to each other may be electrically connected through the same first sensing lines SL1. For example, the sub-electrodes SUE1, SUE2, and SUE3 of the first sensing electrodes TSE1 adjacent to each other may share the first sensing lines SL1. Because the number of first sensing lines SL1 corresponding to the first sensing electrode column TSC1 is equal to the number of sub-electrodes SUE1, SUE2, and SUE3 in each first sensing electrode TSE1, the number of first sensing lines SL1 corresponding to the first sensing electrode column TSC1 may be less than the total number of sub electrodes SUE1, SUE2, and SUE3 in the first sensing electrode column TSC1.

Thus, the number of first sensing lines SL1 in the area between the first sensing electrode columns TSC1 and the second sensing electrode columns TSC2 may decrease. Also, the area in which the first sensing lines SL1 are occupied in the area between the first sensing electrode columns TSC1 and the second sensing electrode columns TSC2 may decrease.

When the number of first sensing lines SL1 in the area between the first sensing electrode columns TSC1 and the second sensing electrode columns TSC2 decreases, the electromagnetic interference between the second and first sensing electrodes TSE2 and TSE1 and the first sensing lines SL1 may decrease. Thus, the touch sensing sensitivity of the second electrode layer 230 may be improved.

When the number of first sensing lines SL1 in the area between the first sensing electrode columns TSC1 and the second sensing electrode columns TSC2 decreases, the area in which the first sensing lines SL1 are occupied, in the area between the first sensing electrode columns TSC1 and the second sensing electrode columns TSC2, may decrease. When the area in which the first sensing lines SL1 are occupied in the area between the first sensing electrode columns TSC1 and the second sensing electrode columns TSC2 decreases, the area of the first sensing electrodes TSE1 or the second sensing electrodes TSE2 may increase. When the area of the first sensing electrodes TSE1 or the second sensing electrodes TSE2 increases, the touch sensing sensitivity of the second electrode layer 230 may be improved.

The second sensing electrode columns TSC2 may include a plurality of second sensing electrodes TSE2. For example, one second sensing electrode column may include q (q is a natural number of 2 or more) second sensing electrodes TES2. The second sensing electrodes TES2 may be arranged in the direction in which the second sensing electrode columns TSC2 extend.

The second sensing electrodes TSE2 may be connected to second sensing lines SL2, respectively. Therefore, the number of second sensing lines SL2 corresponding to the one second sensing electrode column TSC2 may be equal to the number of the second sensing electrodes TSE2, e.g., the number of second sensing lines SL2 corresponding to the one second sensing electrode column TSC2 may be q. The second sensing lines SL2 may be arranged between the second sensing electrode columns TSC2 and the first sensing electrode columns TSC1.

The second sensing lines SL2 may be alternately disposed at left and right sides of the second sensing electrode columns TSC2. For example, the second sensing line SL2 connected to one of the second sensing electrodes TSE2 adjacent to each other may be disposed at the right side of the second sensing electrode column TSC2 In addition, the second sensing line SL2 connected to the other of the second sensing electrodes TSE2 adjacent to each other may be at the left side of the second sensing electrode column TSC2. Therefore, the numbers of second sensing lines SL2 in areas between the first sensing electrode columns TSC1 and the second sensing electrode columns TSC2 may be equal to one another.

The first sensing lines SL1 connected to the sub-electrodes SUE1, SUE2, and SUE3 at the same position in the first sensing electrode columns TSC2 may be electrically connected to each other through first connecting lines CNL1. For example, the j-ary first sensing lines SL1 connected to the jth sub-electrode of the first sensing electrodes TSE1 in one first sensing electrode column TSC1 may be electrically connected to the j-ary first sensing lines SL1 connected to the jth sub-electrode in another first sensing electrode column TSC1 through the first connecting line CNL1. The other first sensing electrode column TSC1 may be a first sensing electrode column TSC1 that is not adjacent to the one first sensing electrode column TSC1, but is spaced apart from the one first sensing electrode column TSC1 among the first sensing electrode columns TSC1.

In one embodiment, the first sensing lines SL1 may be on the insulating layer 220. The first sensing line SL1 may be covered with a protective layer PSV. The protective layer PSV may include at least one of an organic insulating material or an inorganic insulating material. The protective layer PSV may have a first contact hole CNT1 through which a portion of the first sensing line SL1 is exposed. A first connecting line CNL1 may be on the protective layer PSV. The first connecting line CNL1 extends in a direction intersecting the first sensing line SL1 and may be electrically connected to the first sensing line SL1 through the first contact hole CNT1.

The first sensing lines SL1 connected to the first connecting line CNL1 may be electrically connected to the same pad PD among the pads PD of the pad part PA. Thus, when the first sensing lines SL1 are electrically connected to each other through the first connecting line CNL1, the number of pads PD electrically connected to the first sensing electrodes TSE1 may decrease.

In addition, since the j-ary first sensing lines SL1 are connected to each other, the jth sub-electrodes SUE1, SUE2, and SUE3 connected to the j-ary first sensing lines SL1 may receive the same signal applied from the same pad PD. In one embodiment, the j-ary sub-electrodes SUE1, SUE2, and SUE3 connected to the jth first sensing lines SL1 may output the same signal to the same pad PD.

The second sensing lines SL2 connected to second sensing electrodes TSE2 at the same position in the second sensing electrode columns TSC2 may be electrically connected to each other. For example, i-ary (i is a natural number of q or less) second sensing lines SL2 connected to i-ary second sensing electrodes TSE2 in each of three adjacent second sensing electrode columns TSC2 may be connected to a second connecting line CNL2 through a second contact hole CNT2. The connection structure of the second sensing lines SL2 and the second connecting line CNL2 may be equal to the connection structure of the first sensing lines SL1 and the first connecting line CNL1.

Since the i-ary second sensing lines SL2 are electrically connected to each other, three second sensing electrodes TSE2 connected to the i-ary second sensing lines SL2 in the three adjacent second sensing electrode columns TSC2 may be electrically connected to one another.

Accordingly, the second sensing lines SL2 connected to the second sensing electrodes TSE2 at the same position in the second sensing electrode columns TSC2 may be electrically connected to the same pad PD among the pads PD of the pad part PA.

Since the i-ary second sensing lines SL2 are connected to each other, the i-ary second sensing electrode TES2 connected to the i-ary second sensing lines SL2 may receive the same signal (e.g., a pressure driving signal) from the same pad PD. In one embodiment, the i-ary second sensing electrode TES2 connected to the i-ary second sensing lines SL2 may output the same signal (e.g., a touch sensing signal) to the same pad PD.

Since the second sensing lines SL2 connected to the second sensing electrodes TSE2 at the same position in the second sensing electrode columns TSC2 are electrically connected to each other, the number of pads PD electrically connected to the second sensing electrodes TSE2 may decrease.

In this embodiment, the second sensing electrodes TSE2 at the same position in the second sensing electrode columns TSC2 are connected to one pad PD.

In one embodiment, the second sensing electrodes TSE2 at the same position in two or four adjacent second sensing electrode columns TSC2 may be connected to one pad PD.

The sub-electrodes SUE1, SUE2, and SUE3 and the second sensing electrodes TSE2, in FIG. 10, may include a plurality of conductive fine lines CFL. For example, the sub-electrodes SUE1, SUE2, and SUE3 and the second sensing electrodes TSE2 may include a plurality of first conductive fine lines CFL1 extending in one direction parallel to one another. A plurality of second conductive fine lines CFL2 extend in a direction intersecting the first conductive fine lines CFL1 parallel to one another. Thus, the second sensing electrodes TSE2 and the sub-electrodes SUE1, SUE2, and SUE3 may have a mesh structure.

The mesh structure may include a plurality of openings at areas where the first conductive fine lines CFL1 and the second conductive fine lines CFL2 intersect each other. The openings may decrease the area in which the sub-electrodes SUE1, SUE2, and SUE3 and the second sensing electrodes TES2 overlap with the display panel 100. When the area in which the sub-electrodes SUE1, SUE2, and SUE3 and the second sensing electrodes TES2 overlap with the display panel 100 decreases, it is possible to prevent electromagnetic interference between the sub-electrodes SUE1, SUE2, and SUE3 and second sensing electrodes TES2 and the display panel 100. Thus, the touch sensing sensitivity of the second electrode layer 230 may be improved.

In addition, when the area in which the sub-electrodes SUE1, SUE2, and SUE3 and the second sensing electrodes TES2 overlap with the display panel 100 decreases, it is possible to decrease the number of obstacles on a path along which light emitted from the display panel 100 is transferred to a viewer. Thus, it is possible to improve the display quality of the display device including the touch screen (e.g., see 200 of FIG. 1) and the display panel 100.

The first conductive fine lines CFL1 and the second conductive fine lines CFL2 may include at least one of aluminum (Al), copper (Cu), chromium (Cr), nickel (Ni), gold (Au), or platinum (Pt), or alloys thereof. In addition, the first conductive fine lines CFL1 and the second conductive fine lines CFL2 may include a transparent conductive oxide. In addition, the first conductive fine lines CFL1 and the second conductive fine lines CFL2 may include two or more conductive layers.

Figure 11:
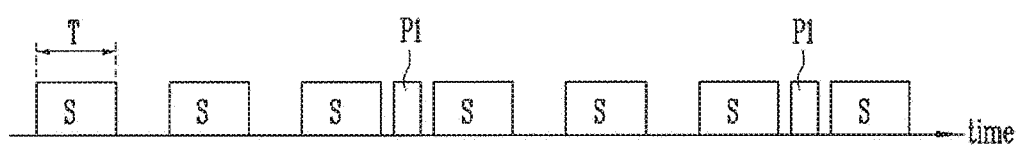
FIGS. 11 and 12 illustrate embodiments of a method for driving a touch screen.
Figure 12:
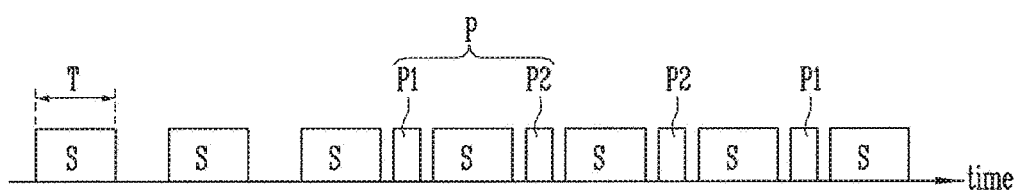

FIGS. 11 and 12 illustrate waveforms corresponding to embodiments of a method for driving a touch screen, e.g., as shown in FIGS. 1 to 10. Referring to FIGS. 1 to 12, a touch driving signal S may be applied to the sub-electrodes SUE1, SUE2, and SUE3 of the first sensing electrodes TSE1 of the touch screen 200. The touch driving signal S may be applied for each of a plurality of touch driving times T that are periodically repeated. The touch driving times T may be spaced apart from each other during a certain period. Times between the touch driving times T may be idle times for which the touch driving signal S is not input.

When the touch driving signal S is applied to the sub-electrodes SUE1, SUE2, and SUE3, the sub-electrodes SUE1, SUE2, and SUE3 may form second sensing electrodes TSE2 and a first capacitor. A first capacitance of the first capacitor formed by the sub-electrodes SUE1, SUE2, and SUE3 and the second sensing electrodes TSE2 may be changed by a touch input of a user.

First, when there is no touch input of the user, the first capacitance may be a first reference capacitance. The first capacitance may be identified, for example, based on a detection signal output from the second sensing electrodes TSE2 and corresponding to the touch driving signal S.

When the user touches the touch screen 200, the first capacitance may be changed. When the user touches the touch screen, the first capacitance output from the second sensing electrodes TSE2 may be less than the first reference capacitance.

The second sensing electrodes TSE2 may receive a pressure driving signal P applied at at least some idle times among the idle times.

When the pressure driving signal P is applied to the second sensing electrodes TSE2, the second sensing electrodes TSE2 may form the first electrode layer 210 and a second capacitor. A second capacitance of the second capacitor formed by the second sensing electrodes TSE2 and the first electrode layer 210 may be changed by external pressure. The second capacitance may be identified through a detection signal output from the second sensing electrodes TSE2 that corresponds to pressure driving signal P.

When the external pressure is not applied to the touch screen 200, the second capacitance may be a second reference capacitance.

When the external pressure is applied, the second capacitance may be changed. When the user applies a pressure, the thickness of the insulating layer 220 may decrease. Therefore, the second capacitance detected by the second sensing electrodes TSE2 may be greater than the second reference capacitance.

The pressure driving signal P may include a first pressure driving signal P1 and a second pressure driving signal P2. The first pressure driving signal P1 may be input at an arbitrary idle time among the idle times. In one embodiment, the first pressure driving signal P1 may be periodically input in units of a plurality of idle times.

When external pressure is detected by the first pressure driving signal P1, the second pressure driving signal P2 may be applied for each of all of the idle times until before the first pressure driving signal P1 is again input.

When the pressure driving signal P is applied at some idle times as described above, power consumption of the touch screen 200 may be decreased compared with the case where the pressure driving signal P is applied for each of all of the idle times.

In accordance with one or more of the aforementioned embodiments, a touch screen and a display device having the same may detect not only a touch position but also a touch pressure. Also, the touch screen does not apply a pressure driving signal for detecting an external pressure for every period, thereby reducing power consumption.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The signal generators and processing features of the disclosed embodiments may be implemented in logic which, for example, may include hardware, software, or both. When implemented at least partially in hardware, the signal generators and processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the signal generators and processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A method for driving a touch screen, the method comprising:
    applying a touch driving signal to sub-electrodes of first sensing electrodes for each of a plurality of touch driving times that are periodically repeated; and
    applying a pressure driving signal to second sensing electrodes at at least some idle times from among idle times between the touch driving times such that the idle times include a first group during which the pressure driving signal is applied at predetermined intervals of idle times and a second group during which the pressure driving signal is not applied,
    wherein when the touch driving signal is applied to the sub-electrodes, a first capacitor is formed by the sub-electrodes and the second sensing electrodes, and
    wherein when the pressure driving signal is applied to the second sensing electrodes, a second capacitor is formed by the second sensing electrodes and an electrode layer overlapping the second sensing electrodes, the electrode layer being a continuous electrode layer having a plate shape.

2. The method as claimed in claim 1, wherein applying the pressure driving signal to the second sensing electrodes comprises:
    periodically applying a first pressure driving signal in units of a plurality of idle times, and
    when an external pressure is detected by the pressure driving signal, applying a second pressure driving signal for each of all of the idle times until before a subsequent first pressure driving signal is applied.

3. The method as claimed in claim 1, wherein applying the pressure driving signal to the second sensing electrodes comprises:
    applying a first pressure driving signal at arbitrary idle times; and
    when an external pressure is detected by the pressure driving signal, applying a second pressure driving signal for each of all of the idle times until before a subsequent first pressure driving signal is applied.

4. The method as claimed in claim 1, wherein a first capacitance of the first capacitor is changed by a touch input of a user.

5. The method as claimed in claim 1, wherein a second capacitance of the second capacitor is changed by external pressure.

* * * * *